US006208989B1

(12) United States Patent
Dockter et al.

(10) Patent No.: US 6,208,989 B1
(45) Date of Patent: Mar. 27, 2001

(54) FACILITY FOR THE INTELLIGENT SELECTION OF INFORMATION OBJECTS

(75) Inventors: Michael J. Dockter, Hollister; Joel F. Farber, San Jose, both of CA (US); Kevin D. Seppi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,869

(22) Filed: Feb. 14, 1997

Related U.S. Application Data

(63) Continuation of application No. 08/262,834, filed on Jun. 21, 1994, now Pat. No. 5,854,923.

(51) Int. Cl.⁷ .................................................. G06F 17/30
(52) U.S. Cl. .................................. 707/5; 705/7; 706/45; 709/203
(58) Field of Search ........................ 707/1–6; 706/54–56, 706/47, 46, 8, 2, 1, 15, 45, 50; 705/7; 709/203, 217–219

(56) References Cited

U.S. PATENT DOCUMENTS

| | | | |
|---|---|---|---|
| 4,905,163 | * | 2/1990 | Garber et al. .......................... 706/55 |
| 4,914,586 | * | 4/1990 | Swinehart et al. ................... 707/101 |
| 4,930,071 | * | 5/1990 | Tou et al. ................................. 707/4 |
| 4,996,642 | * | 2/1991 | Hey ........................................ 705/27 |
| 5,123,900 | * | 6/1992 | Wick ...................................... 602/41 |
| 5,197,005 | * | 3/1993 | Shwartz et al. .......................... 707/2 |
| 5,201,047 | * | 4/1993 | Maki et al. ................................ 707/4 |
| 5,263,167 | * | 11/1993 | Conner, Jr. et al. ...................... 707/4 |
| 5,321,833 | * | 6/1994 | Chang et al. ............................. 707/5 |
| 5,408,655 | * | 4/1995 | Oren et al. ............................ 707/501 |
| 5,446,891 | * | 8/1995 | Kaplan et al. ........................... 707/2 |
| 5,854,923 | * | 12/1998 | Dockter et al. .......................... 707/5 |

OTHER PUBLICATIONS

"Information Filtering and Information Retrieval: Two sides of the same coin," Belkin, J. N. et al., Communications of the ACM, vol. 35, No., 12, pp. 29–38, Dec. 1992.*

* cited by examiner

*Primary Examiner*—Hosain T. Alam
(74) *Attorney, Agent, or Firm*—Lacasse & Associates; Randy W. Lacasse; Ray Strimaitis

(57) ABSTRACT

A system to intelligently link a computer user to enormous databases of multi-media information. The system provides an automated facility to determine the value of information based on each user's subjective preferences. An execution is created by comparing these preferences with prior characterizations of information objects. Once the comparisons are made, an ordered list is compiled. The list provides a set of data sources starting with the most relevant and ending with the least relevant. By selecting and reviewing only the most significant references, the probability of locating a pertinent reference is increased dramatically while increasing the effectiveness of time spent reviewing results.

29 Claims, 3 Drawing Sheets

| Attribute | Value | Preference | Confidence |
|---|---|---|---|
| Logical Relationship | Subset | 0.3 | 20 |
| | Example | 0.9 | 15 |
| Topic | Computers | 0.8 | 30 |
| | Cars | 0.75 | 3 |
| | Philosophy | 0.75 | 10 |
| Language | English | 0.8 | 10 |
| | German | 0.6 | 8 |

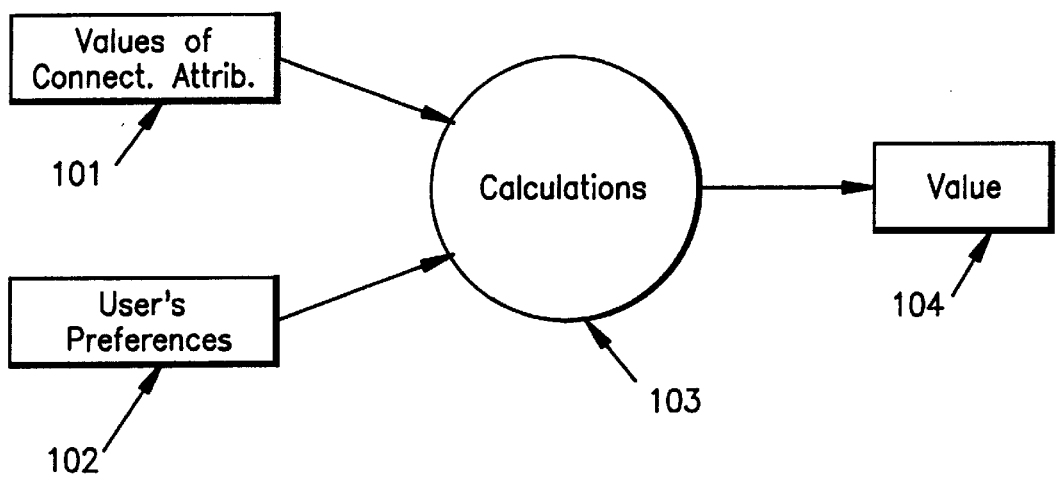

Search preferences (401)
- Automobiles
- English
- Technology
- 1955 Chevy's
- Newer information
- Video information
FIG. 4
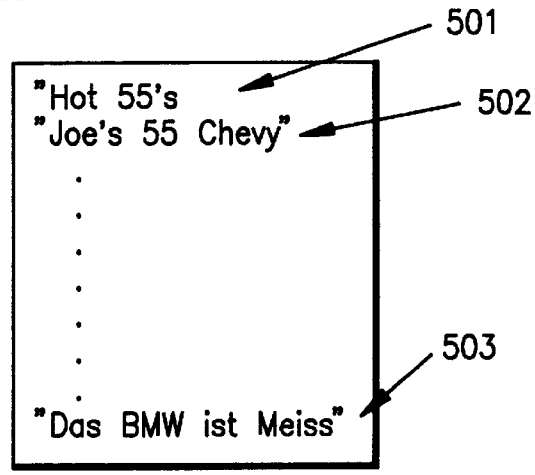
FIG. 5
"Hot 55's — 501
"Joe's 55 Chevy" — 502
.
.
.
.
.
.
"Das BMW ist Meiss" — 503
FIG. 6
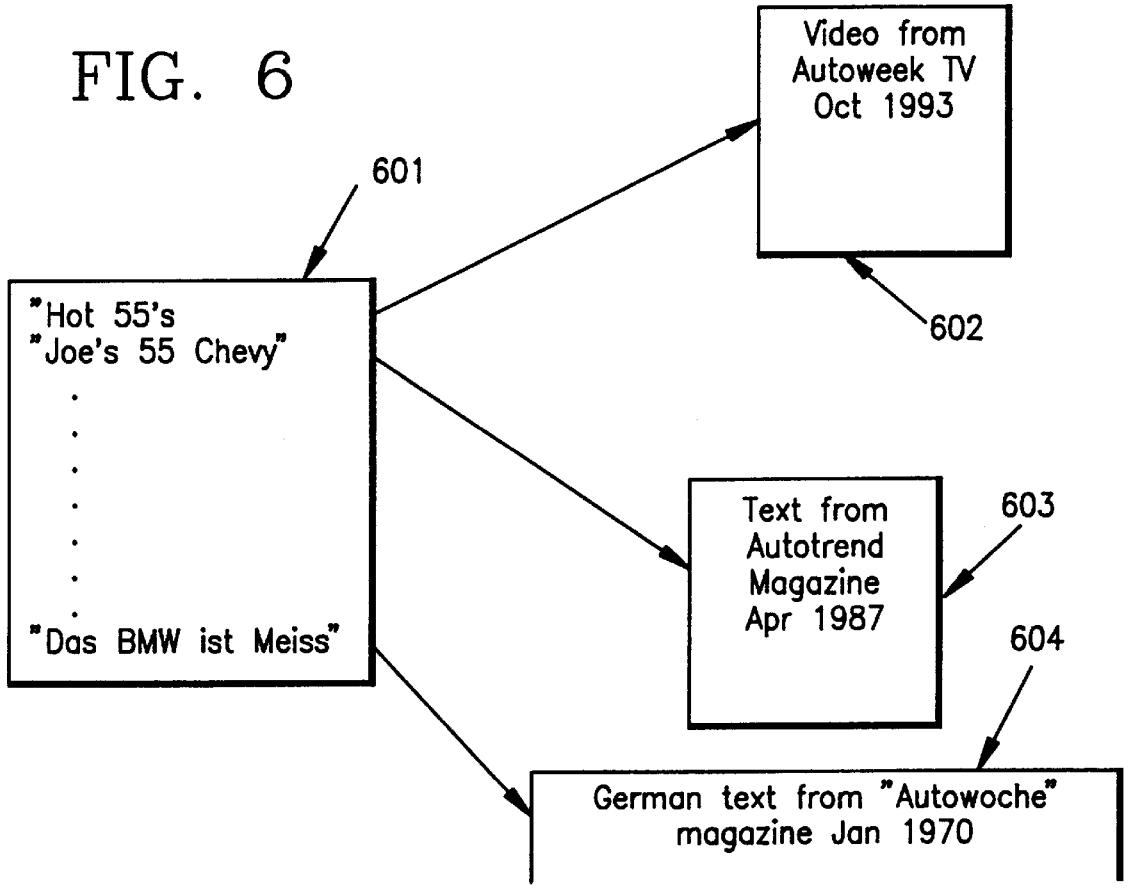

FACILITY FOR THE INTELLIGENT SELECTION OF INFORMATION OBJECTS

This application is a continuation of application Ser. No. 08/262,834 filed Jun. 21, 1994, now U.S. Pat. No. 5,854,923.

BACKGROUND OF THE INVENTION

1. Field of Invention

The present invention relates to effectively coupling a computer user to multi-media data. More specifically, the present invention relates to a method to determine a value of selected subsets of multi-media based on a user's subjective preferences.

2. Related Materials and Definitions

This application is related to the following co-pending applications which are hereby incorporated by reference:

UNIVERSAL TAG IDENTIFIER ARCHITECTURE (application Ser. No. 07/963,885),

METHOD FOR GENERATING CONNECTIONS BETWEEN OBJECTS IN A COMPUTER NETWORK (GRINDING), Ser. No. 08/262,999, now U.S. Pat. No. 5,608,900

FACILITY FOR THE STORAGE AND MANAGEMENT OF INFORMATION OBJECTS (NOUMENA SERVER), Ser. No. 08/,263,146, now U.S. Pat. No. 5,557,790

METHOD FOR THE ASSOCIATION OF HETEROGENEOUS INFORMATION, Ser. No. 08/262,838 pending, FACILITY FOR THE STORAGE AND MANAGEMENT OF CONNECTIONS (CONNECTION SERVER) Ser. No. 08/267,022 pending and METHOD FOR STORING AND RETRIEVING HETEROGENEOUS CLASSIFICATION SYSTEMS Ser. No. 08/263,379 pending.

The following definitions may be helpful to the understanding of the terminology as cited throughout the above related materials. This terminology may be used throughout the background, specification and claims of the present invention:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience Phenomena can be ideas, written matter, video, computer data, etc. Examples include viewing a computer file using a word processor, watching a digital video clip or listening to a digital audio segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: Another concept in the logical structure of the system is "Noumena". Noumena are that which lie beyond the realm of human perception. In computer-based systems, such as the instant invention, they are the computer stored data, examples are "computer files" or datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect a new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of co-pending application "Method for Association of Heterogeneous Information" It supports the Tag Architecture, Connection Server, Grinding, Noumena Server and the design and infrastructure of the overall system, but is not limited thereto. The term "Phenomena" could be read "object", and the term "Connection" could be read "link" in this disclosure. The distinction between Noumena and Phenomena is made to distinguish between objects as experienced by users (Phenomena) and objects as they are actually stored (Noumena).

DISCUSSION OF PRIOR ART

Accessing computer information has become an overwhelming task. Today databases, both local and distributed, contain enormous volumes of information. No longer are databases limited to textual entries but rather a whole world of data is now available in the form of video, audio, photographs, etc.—collectively referred to as multi-media. For the average person trying to locate a particular subset of data quickly, or at all, has become near impossible.

Various prior art systems have attempted to provide various filters to limit the breadth of information or to narrow the scope of a search for particular information. Common word searching techniques are useful in locating specific textual information desired. The user is limited however by their own knowledge of the techniques of word searching and by their knowledge and understanding of the subject for which they are seeking corresponding stored data. Narrowing the search with specific key words may obtain specific references which might be useful. The immediate consequences of using specific key words is potential elimination of many excellent sources germane to the subject matter desired. The converse, broadening the search terms creates information overload with no immediate method to analyze the quantity or quality of the information. The user is forced to use additional key terms or other filters to eliminate sources of material until it approaches a manageable subset. Each filter stage eliminates potentially applicable references.

The following example might be helpful in illustrating typical word search limitations. If a user were trying to locate all computer stored information on "rock climbing", a simple word search on a small database of data, using the term "rock climbing", should produce a volume of manageable references which the user could then peruse If the source database was now expanded to include many computer coded sources of data (i.e. network sources), the terms "rock climbing" would produce an enormous quantity of source documents. The user would be confronted with: articles on rock climbing, video (i.e. movies or recorded television about rock climbing), audio (recorded instructional tapes, songs), photographs, etc. The shear volume of material would be overwhelming with no intelligent means to synthesize the useful from the inapplicable.

The following are examples of known prior art.

Hypertext/Hypermedia

Hypertext, and its multimedia counterpart hypermedia, are methods used by programmers to interconnect references to additional related sources. Hypertext programmers usually store maps of selected links for a particular application within the application itself. These are "closed" systems with no external API's to add links from outside their application Additional limitations of Hypertext are its static authoring linking process, rapid development of large volumes of data and its inability to crosslink easily to remotely located, and incompatible, sources of information. The most beneficial uses of hypertext/hypermedia are restricted to the workstation level.

Entity-Relationship Model

Chen developed the "Entity-Relationship Model". Chen sought to model the relationships universal to a class of entities. His goal was to unify data models for the rigid, predefined, structure provided in database systems. The system fails to provide for a dynamic individualized method to interrelate instances of information, but rather is directed to relating entire classes of information.

It is therefore seen that a problem exists in the prior art to intelligently sift through large volumes of computer coded data sources to select references which would be most useful or interesting to a specified requestor.

OBJECTS OF THE INVENTION

It is an object of the invention to provide a method of valuing a subset of user selected data derived from computer coded data sources.

It is a further object of the invention to base said valuing method on the preferences of the user.

It is a further object of the invention to store prior characterizations of the user to develop a user's subjective preferences.

It is a further object of the invention to provide to the user an ordered ranked list based on a comparison of the values of the subset of user selected data and the user's subjective preferences It is further an object of the present invention to provide an ordered ranked list which is immediately useable to the requestor.

SUMMARY OF THE INVENTION

In the world of information overload, the present invention provides an automated facility, hereafter "Persona", to determine the value of information based on each user's subjective preferences. An execution is created by comparing these preferences with prior characterizations of information objects. Once the comparisons are made an ordered list is compiled. The list provides a set of data sources starting with the most relevant and ending with the least relevant. By selecting and reviewing only the most significant references, the probability of locating a pertinent reference is increased dramatically while increasing the effectiveness of time spent reviewing results.

The system delivers a knowledge service with minimum effort required to find the knowledge of most interest with the least cost and time. Knowledge can be presented in priority order for each user based on their history and preferences. Facilities are provided to identify, and process multi-media information on a universal scale.

Persona represents a point of view. This point of view is independent of the data. The output of the Persona estimates the value of the Connected Phenomena relative to a particular point of view. The point of view can vary from concrete and objective to fuzzy and subjective. This is unique in the world of software.

BRIEF DESCRIPTION OF THE DRAWINGS

FIG. 1 represents a flow diagram of the present invention.

FIG. 2 illustrates an example of the preferences of a user.

FIG. 4 illustrates an example of the search preferences of the user.

FIG. 5 illustrates an example of the ordered results as displayed to the user.

FIG. 6 illustrates an example of the information obtained by the ordered results.

DETAILED DESCRIPTION OF THE INVENTION

Figure 3:
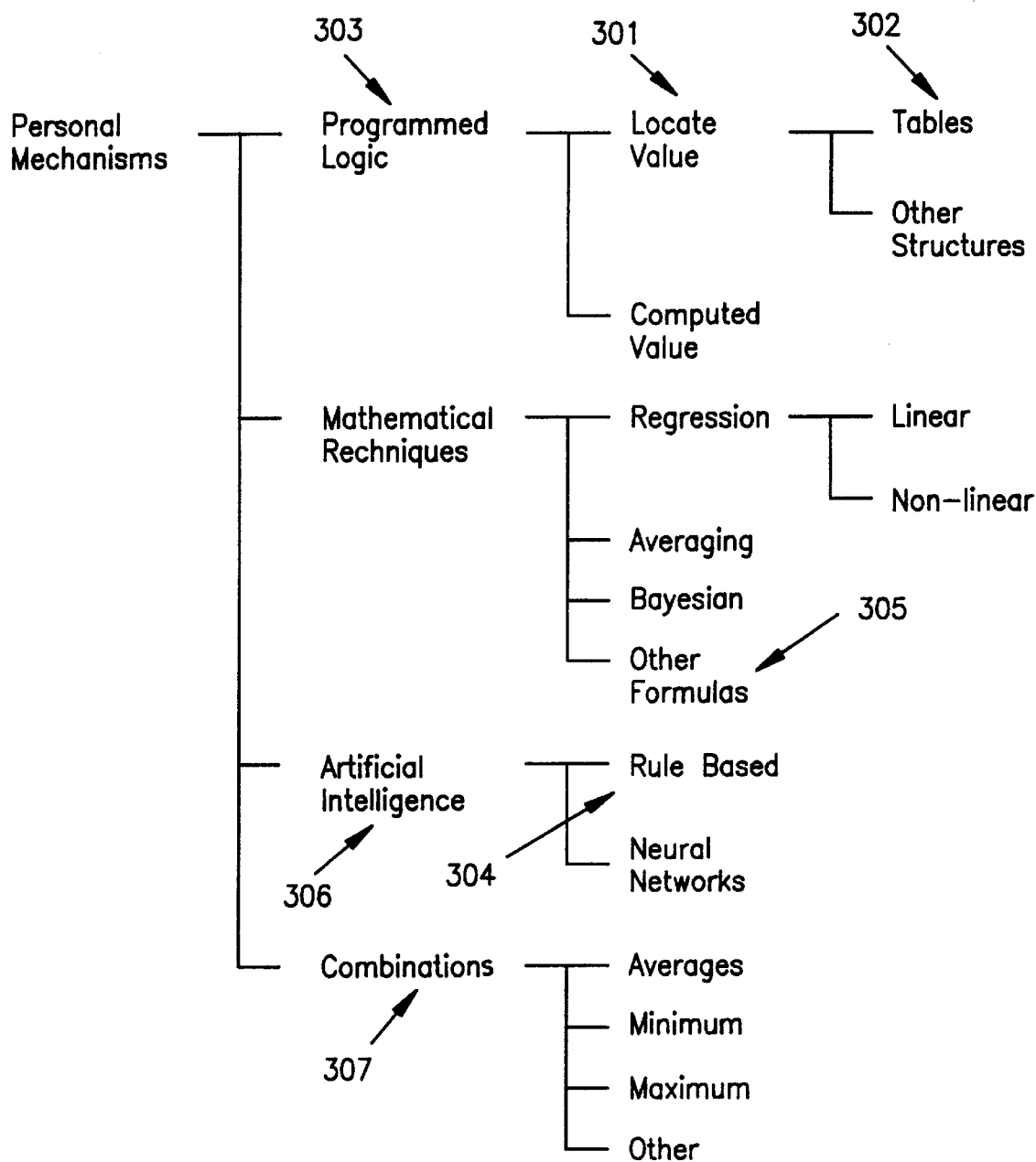
FIG. 3 illustrates a tree diagram of the various methods of implementing the present invention.

The present system, hereafter referred to as "Persona", helps alleviate the information overload situation by evaluating and categorizing the multi-media information available for presentation. A Persona is defined as a class of processes (computer programs) which evaluate Connections (links between Phenomena (stored data objects)) in light of user preferences.

In FIG. 1, the process of evaluating Connections in light of user preferences depends on two inputs: The first input 101 reflects the values of the selected set of Connection Attributes for a Connection. The second input 102 is a representation of the user's preferences. A series of calculations 103 is made based on these inputs and a value is returned 104. The specifics of this process will be discussed hereafter.

Connection Attributes characterize a relationship of one Phenomena to another Phenomena. This characterization can be made in terms of "adjective like" classifications of the subject Phenomena or in terms of "relational" classifications between the two connected Phenomena. This will help determine the relationship of the Phenomena pointed to by the Connection, as perceived by the observer who made the Connection.

The representation of the user's preferences can be encapsulated by several techniques including: computer programs, tables, rules, formulas, and/or methods based on heuristics and artificial intelligence techniques, especially neural networks.

FIG. 2 illustrates an example of a user's preferences. As can be seen in the example, the preferences 201 range from 0, dislike or of no usefulness, to 1, like or of greatest usefulness, and the confidence 202 is a positive integer. All attribute values not explicitly modeled have no influence. The particular user modeled in this example likes to look at examples 203 but not subsets 204, meaning that when looking at information on a topic, an example is more helpful to this user than focusing in on some part of it ( i.e. a subset). This user is interested in computers, cars, and philosophy 205, but the confidence on cars is low 206, meaning that this preference is easily overridden by other factors This user prefers materials in English 207 the most and materials in German 208 the second most.

In this disclosure, the above encapsulation is called the "Core encapsulation". Encapsulations can be constructed manually or automatically. One example of automatic construction techniques is to monitor the user's behavior to determine the user's preferences Another example would be to query the user for the preferences as objects are displayed. FIG. 3 shows a tree diagram illustrating the various alternative methods to calculate a value for the Connection (which estimates the utility of a Connected Phenomena).

The values of the Connection Attributes may be:

Input into a computer program which encapsulates the user's preferences 303.

Used to locate the values 301 in data storage structures i.e. tables 302 and other structures) which represent the user preferences.

Evaluated using rules 304 which represent the user's preferences.

Input into formulas 305 which represent the user's preferences.

Input into artificial intelligence methods 306.

Applied to a combination of the above techniques 307.

The resultant value is normalized (e.g. assigned on a scale from zero to one). All Persona in the system normalize to a value range from zero to one to facilitate combinations of Persona output.

Optionally, another process can combine a Persona's resultant values with results from other Persona. This allows Persona developed separately to be combined.

Set of Connections

Up to this point, the discussion has been limited to the evaluation of a single Connection. In an instance of the system of co-pending application "METHOD FOR THE ASSOCIATION OF HETEROGENEOUS INFORMATION", there are many Connections to evaluate. This evaluation would be intractable except that at each step, as the user navigates through the available information, algorithms are applied to limit the number of edges evaluated. For example: only neighboring information may be considered. That is, only Connections emanating from the "current" node are considered. By human standards, this may be a large number of Connections but it is a mere fraction of the total number of Connections in the system, and can be rapidly processed by the Persona.

Having evaluated a subset of Connections on a normalized scale, the results can be easily ordered for presentation. Additionally, since the resulting values are normalized they can be integrated with output of other Persona for presentation.

A generalized algorithm for Connection evaluation is as follows:

1. Select an appropriate algorithm to limit the number of Connections to search (e.g. only directly emanating connections).
2. For each Connection selected by the above algorithm:
   a. Obtain the set of Connection Attributes (the domains) for the current Connection from the Connection Server.
   b. From this set, select the values of the Connection Attributes used as input for the Core encapsulation.
   c. Apply default values as necessary for any Connection Attributes used as input for the Core encapsulation, but not specified explicitly for this Connection.
   d. Apply one of the various methods described for Core encapsulation to determine the resultant value.
   e. Scale the prior resulting value to a canonical range.
   f. Save this Connection and its estimated value from this process (output the data).
   g. Continue until all selected Connections have been processed or the user chooses to discontinue.

The process outline above may be done serially or in parallel.

FIG. 4 is a list of search preferences. These preferences 401 allow the persona to rank or grade available information objects. FIG. 5 shows references 501, 502, 503 to available information objects in rank order. This allows the user to identify the most relevant information sources. Color could also be used to allow the user to visually distinguish a long list of highly valued sources from a long list of poor sources.

FIG. 6 shows the list of references 601 with the associated information objects 602, 603, 604. In the preferred embodiment, users can retrieve and view the associated information object by marking the corresponding reference. In this example, a quick comparison of the search preferences shown in FIG. 4 with the ordering of references shown in FIG. 6 demonstrates the actions of the persona.

DESCRIPTION OF THE PREFERRED EMBODIMENTS

In the preferred embodiment the estimated value of a Connection is computed based on an arbitrary mapping of Connection Attribute values combined with a linear function. Simple programmed logic is implemented, based on the date of creation of the Phenomena, combined with increased priority due to specific areas of personal interest.

In the following example, the user specified priority topics are: "computer science" and "automotive technology".

This algorithm only considers Connections directly adjacent to the current node. A wider pattern of specified depth could also be evaluated.

The algorithm is as follows:

1. Request all Connections emanating from the current Phenomena and their corresponding Connection Attributes as stored in the Connection Server. The current Phenomena is identified by a globally unique identifier, e.g. a Tag.
2. For each Connection and its Connection Attributes:
   a. Obtain the Connection Attribute values used as input for the Core Encapsulation. The Connection Attributes of interest in this example are: Creation date-time stamp, and topic.
   b. Use default values for any Connection Attributes needed as input for the Core Encapsulation, but not found for this Connection.
   c. Apply the Core Algorithm to determine an intermediate value.

1) The age of the Connected Phenomena is computed using the current date/time-stamp and the creation date from the Connection Attribute specified above. This results in "age" in days and hours.
2) Normalize the age of the articles: Set any article having a creation date before 1950 to a creation date of 1950. Then compute the normalized age by applying the following formula:

(The difference in time between the creation of target article and the year 1950) divided by (The difference in time between the current-date-timestamp and the year 1950).

3) Set the "preference coefficient" based on the "topic" Connection Attribute:
   a) For computer science, set the preference coefficient to 0.90.
   b) For automotive technology, set the preference coefficient to 0.60.
   c) For all other topics, set the preference coefficient to 0.40.

Thus computer science material is more interesting than the automotive material which in turn is more interesting than other articles. This is table of preference coefficients was created subjectively by the user.

d. Multiply the normalized age by the preference coefficient to yield the estimated value of the Connection.
e. Return this Connection and its estimated value to the user for presentation in estimated value order.
f. Continue until all Connections have been processed or the user chooses to discontinue.

3. Indicate completion to the user.

Persona are data driven (e.g. using the Connection Attribute data of the related materials). This information is not collected nor stored on a per user basis, but on the basis of the Connection Attributes, dramatically increasing efficiency.

Connection Attributes and their values are the input to the Persona. Connection Attributes provide the meta-data used by the Persona to intelligently guide the user through the graph of Connected Phenomena.

The Persona is able to operate in the absence of complete information (e.g. Connection Attributes) by the use of default information value substitution.

Persona are shareable. Users may be authorized to use Persona constructed for use by others.

New Persona can be synthesized from existing Persona. For example: Persona "C" may be created by algorithmically combining 30% of Persona "A" and 70% of Persona "B".

Because Persona yield results in the range 0–1, a Persona can be synthesized dynamically using techniques from Probability Theory.

Persona need not be unique; multiple Persona may be owned and used by an individual or group.

Persona process independence; the system design allows structural independence of most processes enabling exploitation of computers that may be loosely coupled, multi-threaded, and/or support parallel processing.

In the co-pending "Method for Association of Heterogeneous Information", Persona may be deployed as a single location (node) or as a network (distributed) or Connected location (nodes).

CONCLUSIONS

A system and method has been shown in the above embodiments for the effective coupling of a computer user to multi-media data. More specifically, the present invention provides a method to determine a value of selected subsets of multi-media based on a users' subjective preferences. While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for recognizing and retrieving a subset of objects related to a selected object based on stored evaluations of relationships between connected objects comprising the steps of:
   a. Creating a profile or selecting a prestored profile, said profile comprising user preferences;
   b. Setting parameters defining connections between objects to be evaluated;
   c. Recognizing a connection of one or more objects connected to said selected object based on said parameters;
   d. Retrieving domain attributes of said recognized connection from said stored evaluations;
   e. Selecting specific values of one or more of said retrieved domain attributes;
   f. Setting default values for a connection not containing a selected specific value;
   g. Creating a resultant value based on the relationship of said stored evaluations to said profile;
   h. Scaling said resulting value;
   i. Repeating steps c-h for a plurality of connections, and
   j. Returning to said user an ordered list of said objects having the highest resultant value.

2. A method for recognizing and retrieving a subset of objects as per claim 1, wherein said creating profile step includes querying a user's preference of one or more displayed objects.

3. A method for recognizing and retrieving a subset of objects as per claim 1, wherein said creating profile step includes deriving a user's preferences based on a historical analysis of prior selections.

4. A method for recognizing and retrieving a subset of objects as per claim 1, wherein said prestored profile comprises a combination of two or more prestored profiles.

5. A method for recognizing and retrieving a subset of objects as per claim 1 wherein said creating profile step further includes combining a prestored profile with said created profile.

6. A method for recognizing and retrieving a subset of objects as per claim 1, wherein said setting of parameters comprises selecting the type of connection to be evaluated.

7. A method for recognizing and retrieving a subset of objects as per claim 6, wherein said type of connection to be evaluated comprises directly emanating connections.

8. A method for recognizing and retrieving a subset of objects as per claim 1, wherein said objects of said ordered list may be selected for viewing by said user by selection from said ordered list.

9. A method for recognizing and retrieving a subset of objects as per claim 1, wherein said repeating of steps c-h may be performed sequentially or in parallel.

10. A method for recognizing and retrieving a subset of objects as per claim 1, wherein said step of creating a resultant value comprises an arbitrary mapping of connection domain attribute values in combination with a linear function.

11. A method for recognizing and retrieving a subset of objects as per claim 1, wherein said step of creating a resultant value is based on priority matching of a user preference profile of specific areas of interest.

12. A method for recognizing and retrieving a subset of objects as per claim 1, wherein said step of creating a resultant value is based on priority matching of one or more user selected topics.

13. A method for recognizing and retrieving a subset of objects as per claim 1, wherein said step of creating a resultant value is based on priority matching of a normalized date of creation.

14. A method for recognizing and retrieving a subset of objects as per claim 1, wherein said step of creating a resultant value is based on a multiplication of a normalized age and a user preference coefficient.

15. A method for recognizing and retrieving a subset of objects as per claim 1, wherein said objects are located across networks.

16. A method for recognizing and retrieving a subset of objects, located across networks, related to a selected object based on stored evaluations of relationships between connected objects comprising the steps of:

a. Creating a profile or selecting a prestored profile, said profile comprising user preferences;

b. Setting parameters defining connections between objects to be evaluated;

c. Recognizing a connection of one or more objects remotely connected to said selected object based on said parameters;

d. Retrieving domain attributes of said recognized connection from said stored evaluations;

e. Selecting specific values of one or more of said retrieved domain attributes;

f. Setting default values for a connection not containing a selected specific value;

g. Creating a resultant value based on the relationship of said stored evaluations to said profile;

h. Scaling said resulting value;

i. Repeating steps c-h for a plurality of connections, and j. Returning to said user an ordered list of said objects having the highest resultant value.

17. A method for recognizing and retrieving a subset of objects as per claim 16, wherein said creating profile step includes querying a user's preference of one or more displayed objects.

18. A method for recognizing and retrieving a subset of objects as per claim 16, wherein said creating profile step includes deriving a user's preferences based on a historical analysis of prior selections.

19. A method for recognizing and retrieving a subset of objects as per claim 16, wherein said prestored profile comprises a combination of two or more prestored profiles.

20. A method for recognizing and retrieving a subset of objects as per claim 16, wherein said creating profile step further includes combining a prestored profile with said created profile.

21. A method for recognizing and retrieving a subset of objects as per claim 16, wherein said setting of parameters comprises selecting the type of connections to be evaluated.

22. A method for recognizing and retrieving a subset of objects as per claim 21, wherein said type of connections to be evaluated comprises directly emanating connections.

23. A method for recognizing and retrieving a subset of objects as per claim 16, wherein said objects of said ordered list may be selected for viewing by said user by selection from said ordered list.

24. A method for recognizing and retrieving a subset of objects as per claim 16, wherein said repeating of steps c-h may be performed sequentially or in parallel.

25. A method for recognizing and retrieving a subset of objects as per claim 16, wherein said step of creating a resultant value comprises an arbitrary mapping of connection domain attribute values in combination with a linear function.

26. A method for recognizing and retrieving a subset of objects as per claim 16, wherein said step of creating a resultant value is based on priority matching of a user preference profile of specific areas of interest.

27. A method for recognizing and retrieving a subset of objects as per claim 16, wherein said step of creating a resultant value is based on priority matching of one or more user selected topics.

28. A method for recognizing and retrieving a subset of objects as per claim 16, wherein said step of creating a resultant value is based on priority matching of a normalized date of creation.

29. A method for recognizing and retrieving a subset of objects as per claim 16, wherein said step of creating a resultant value is based on a multiplication of a normalized age and a user preference coefficient.

* * * * *

UNITED STATES PATENT AND TRADEMARK OFFICE
CERTIFICATE OF CORRECTION

PATENT NO. : 6,208,989 B1
DATED : March 27, 2001
INVENTOR(S) : Dockter et al.

It is certified that error appears in the above-identified patent and that said Letters Patent is hereby corrected as shown below:

Title page,
After "Objects" insert therefore (PERSONA)

Drawings,
Figure 3, delete "Mathematical Rechniques" insert therefore -- Mathematical Techniques --.

Figure 5, delete "Meiss" insert therefore -- Heiss --.
After "Hot 55's" insert -- " --.

Figure 6, after "Hot 55's" insert -- " --.
Delete "Meiss" insert therefore -- Heiss --.

Column 1,
Line 47, delete "phenomena" insert therefore -- Phenomena --.
Line 49, delete "phenomena" insert therefore -- Phenomena --.
Line 50, after "experience" insert therefore -- . --.

Column 2,
Line 55, after "etc." insert therefore -- , --.
Line 55, before "collectively" delete ----.
Line 63, after "limited" insert therefore -- , --.
Line 64, after "however" insert therefore -- , --.

Column 3,
Line 3, after "broadening" insert therefore -- of --.
Line 33, after "application" insert therefore -- . --.
Line 47, after "is" insert therefore -- , --.
Line 47, after "therefore" insert therefore -- , --.

Column 6,
Line 62, delete "date-time stamp" insert therefore -- date/time stamp --.

UNITED STATES PATENT AND TRADEMARK OFFICE
CERTIFICATE OF CORRECTION

PATENT NO. : 6,208,989 B1
DATED : March 27, 2001
INVENTOR(S) : Dockter et al.

It is certified that error appears in the above-identified patent and that said Letters Patent is hereby corrected as shown below:

Column 7,
Line 2, delete "date/time-stamp" insert therefore -- date/time stamp --.
Line 20, after "Thus" insert therefore -- , --.
Line 22, after "This" delete -- is --.
Line 11, delete "current-date-timestamp" insert therefore -- current date/time stamp --.
Line 60, after "co-pending" insert therefore -- application --.

Column 8,
Line 47, after "as per claim 1" insert therefore -- , --.

Signed and Sealed this

Twenty-seventh Day of November, 2001

*Attest:*

*Attesting Officer*

NICHOLAS P. GODICI
*Acting Director of the United States Patent and Trademark Office*